FREQUENCY DIVIDING CIRCUIT

Filed April 2, 1946

INVENTOR
JOHN K. PHELAN
BY
William D. Hall
ATTORNEY

Patented Sept. 22, 1953 2,653,236

UNITED STATES PATENT OFFICE 2,653,236

FREQUENCY DIVIDING CIRCUIT

John K. Phelan, Medford, Mass., assignor, by mesne assignments, to the United States of America as represented by the Secretary of War Application April 2, 1946, Serial No. 658,934

6 Claims. (Cl. 250—27)

This invention relates generally to a frequency division circuit and, more particularly, to a blocking oscillator for use as a frequency divider.

An object of the present invention is to provide a frequency dividing circuit adapted to produce in its output a series of pulses at a frequency which is a desirable integral sub-multiple of a controlling input trigger pulse series. For example, the frequency divider may be responsive to every $n^{th}$ trigger pulse in the continuous succession of input trigger pulses, and produce in its output a pulse synchronized with the trigger pulse. Those trigger pulses intermediate between successive $n^{th}$ trigger pulses produce no ouput. It is a further object that the frequency divider perform the above described division function for a series of trigger pulses having either a fixed or a variable recurrence or pulse repetition frequency (P. R. F.)

The frequency dividing circuit contemplated includes at least one vacuum tube which has a voltage supply source for providing suitable operating potentials to the tube. While operating, the voltage supplied by said source, and the various parameters associated with the tube, may vary slightly. It is another object of the present invention to provide such frequency dividing circuit, the normal operation of which is not affected by the described variations, and which will insure stable operation and provide reliable results.

Another object of the present invention is to provide a blocking oscillator circuit which is adapted to produce in its output a series of pulses which occur simultaneously with the controlling input tirgger series. It is intended that the output pulses possess several characteristics, such as steep leading edges, high amplitude, and short duration.

Figure 1:
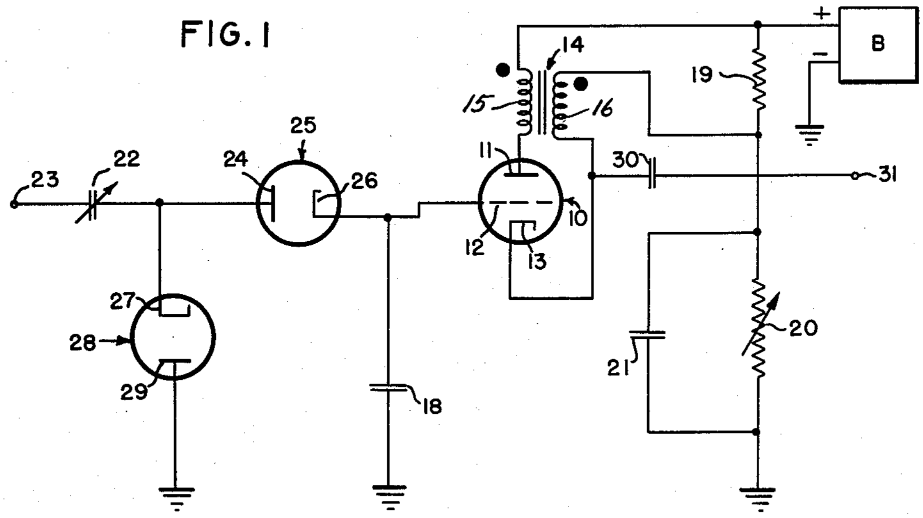
Figure 2:
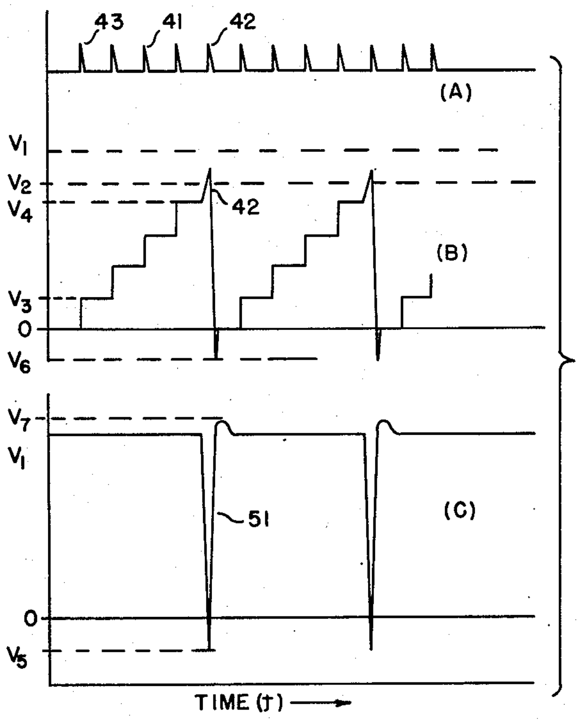

Other objects, features and advantages of this invention will suggest themselves to those skilled in the art, and will become apparent from the following description of the invention, taken in connection with the accompanying drawings in which:

Fig. 1 is a schematic diagram of a blocking oscillator frequency divider circuit embodying the principles of this invention; and Fig. 2 shows voltage-time graphs illustrating the operational aspects of the embodiment shown in Fig. 1.

Referring to the schematic diagram of Fig. 1, there is shown an embodiment of the invention in the form of a blocking oscillator circuit including vacuum tube 10, having an anode 11, control grid 12, and cathode 13. The embodiment shown includes a pulse transformer 14. The pulse transformer comprises two windings 15, 16, closely coupled together and wound on an iron core. The dots indicate the relative polarity of the voltages induced in the transformer windings. For example, the ends of the windings having dots are positive at the same time. One end of winding 15 is connected to anode 11, and the opposite or upper end is connected to the positive terminal of a suitable source of potential, designated herein as voltage B+. The negative terminal of the voltage source B+ is grounded. A voltage divider comprising resistance 19 in series with cathode resistor 20 is connected between the positive and negative terminals of the source B. One end of winding 16 is connected to cathode 13, and the opposite or upper end is connected to the junction of resistors 19 and 20. The windings of the transformer are connected such that for a decrease in voltages on the plate, there will be a corresponding decrease in voltage at the cathode. By-pass condenser 21 is connected in parallel with cathode resistor 20. Control grid 12 is returned through storage condenser 18 to ground potential, and also to cathode 26 of diode 25. Anode 24 of diode 25 is connected to one side of variable coupling capacitor 22, and also to cathode 27 of diode 28. Anode 29 of diode 28 is connected to ground. The opposite side of capacitor 22 is connected to input terminal 23.

The series of positive input trigger pulses is applied to terminal 23. The output is taken from the cathode of tube 10, and is applied through capacitor 30 to output terminal 31.

To facilitate in the explanation of the operation of the circuit the voltage-time graphs of Fig. 2 will be referred to. Fig. 2 includes three approximately voltage-time graphs illustrating the voltage variation at three points in the circuit of Fig. 1. The graphs are plotted on the same time scale and reference axis with different voltage scales for each graph. Graph A shows a series of input trigger pulses 41 having a fixed pulse repetition frequency (P. R. F.). Graph C is the approximate representation of the output voltage pulses which appear at cathode 13 of tube 10, there being, for the case illustrated, one output pulse for each fifth input trigger pulse. Graph B illustrates the approximate voltage variation at control grid 12 of tube 10. The potential on cathode 13 of tube 10 is fixed by the potential dividing action of resistors 19 and 20, and is of such a positive value, with respect to the ground potential, as indicated by voltage $V_1$ of Fig. 2. Voltage $V_2$, indicated in Fig. 2, represents the grid cut off voltage of tube 10. For any voltage present on grid 12 which is less than voltage $V_2$, tube 10 will be in a nonconducting state.

In the operation of the circuit of Fig. 1, grid 12 of tube 10 is originally at ground potential due to the previous operation of the circuit. With the receipt of the first positive trigger pulse, such as pulse 43 in Fig. 2, diode 25 conducts and the trigger pulse is applied to capacitor 18. A positive voltage charge, such as voltage $V_3$, indicated in Fig. 2, remains on capacitor 18 at the termination of the trigger pulse. With each succeeding trigger pulse, a corresponding voltage charge remains on condenser 18, and the voltage existing across the condenser increases in a stepped fashion as indicated in the figure. The voltage existing across condenser 18 and each trigger pulse is coupled directly to grid 12 of tube 10. When condenser 18 is step-charged to a value indicated in Fig. 2 by voltage $V_4$, and a trigger pulse, such as 42 of Fig. 2, of sufficient magnitude to cause the grid voltage to exceed the cut off value $V_2$ in Fig. 2 arrives, tube 10 immediately starts to conduct. The sudden decrease in plate voltage is applied, through transformer 14, to cathode 13 of tube 10. As the cathode is driven less and less positive with respect to the control grid, the plate current continues to increase until the tube parameters are driven far into the nonlinear region of the tube characteristics. This action is cumulative and rapid until the grid-cathode bias voltage becomes less and less effective as compared to the plate voltage in controlling the current flow through the tube. A transition period or interval occurs and the plate voltage is driven quickly back to its original value. This action is again cumulative and rapid. The variation in cathode voltage is shown by negative pulse 51 of curve or graph C of Fig. 2.

During the transition period the cathode 13 is driven to a negative value with respect to ground potential as indicated by voltage $V_5$, Fig. 2. As the cathode voltage decreases, the grid becomes positive with respect to the cathode, and grid current flows. The voltage charge on condenser 18 leaks off through the grid-cathode circuit of the tube. The grid-cathode conduction resistance is low and the voltage at the grid follows closely behind the voltage on the cathode. With a continuation of this action, the polarity of the voltage charge existing across condenser 18 is reversed, and a negative voltage charge, with respect to the ground potential, such as voltage $V_6$, Fig. 2, exists at cathode 26 of diode 25. The negative potential at cathode 26 renders diode 28 and 25 conductive at the end of the transition period, and the charge on condenser 18 decays exponentially to ground potential through the two diodes at a rate depending upon the time constant comprising the diode conduction resistances and the value of condenser 18.

At the termination of the transition period, the energy stored in winding 15 may drive the plate potential of tube 10 momentarily greater than voltage B+. The cathode voltage is also driven more positive, as indicated by voltage $V_7$, Fig. 2. A cycle of step-charging action of the blocking oscillator circuit is thereby completed. The blocking oscillator derives its name from the above-described chain of events, which is sometimes referred to collectively as the blocking action.

The pulse output of the circuit embodying the principles of this invention is characterized by having steep edges on either side of the output pulse.

Cathode resistor 20 is by-passed by condenser 21, as shown in Fig. 1, to eliminate degeneration during the period of the output pulse. The time constant comprising condenser 21 and resistor 20 is made long compared to the repetition rate of the output pulse, so that operation of the circuit is not affected by changes in the repetition rate.

With a predetermined value of cathode bias voltage, the magnitude of the voltage charge remaining on condenser 18 after the receipt of each input trigger pulse, and hence the number of charging steps existing before tube 10 conducts, is related to the magnitude of input trigger pulse. The value of condenser 22 may be variable, as indicated, to regulate the amplitude of the individual trigger pulses, and thereby control the frequency dividing characteristic of the circuit.

The frequency dividing characteristic 15 is also related to the value of cathode bias on tube 10, which bias may be varied by changing the resistance of resistor 20.

Frequency division, as mentioned, is related to the magnitude of the trigger pulse, and the value of a cathode bias. For the example given, the frequency division was 5 for the series of input trigger pulses having a fixed prf as described. This invention is adapted to divide the frequency of a series of pulses not having a fixed prf, assuming that the charge on condenser 18 will not leak off during an extended interval between the receipt of two successive trigger pulses. The circuit, therefore, provides a counter means for a succession of input pulses having a fixed, or a variable pulse repetition frequency.

The invention is also adapted to divide the frequency of a series of input sine waves as well as a series of trigger pulses as described.

The output may be taken from the blocking oscillator by the means described, in which case the output is a series of negative pulses. Output may also be derived from a third winding on transformer 14, not shown in the figure, in which case the output may be a series of positive or negative pulses, depending upon the polarity of the added winding with respect to winding 16. The output may also be derived from anode 11 of tube 10.

When the cathode bias is adjusted properly, the blocking oscillator may be made to block upon the receipt of each individual trigger pulse, and, thereby, provide a series of high amplitude, steep edged, output pulses occurring simultaneously with the series of input trigger pulses.

While there has been described hereinabove what is at present considered to be a preferred embodiment of this invention, it will be obvious to those skilled in the art that various changes and modifications may be made therein without departing from the spirit and scope of the invention.

What is claimed is:

1. In a frequency dividing circuit, a blocking oscillator comprising a first vacuum tube having at least a control grid, cathode, and anode, second and third vacuum tubes having respectively at least an anode and cathode, a two-winding transformer, a source of potential having a positive terminal and a negative terminal, one end of one winding of said transformer being connected to the anode of said first tube, and the other end of said one winding being connected to said positive terminal, one end of the second winding of said transformer being connected to the cathode of said first tube and the other end of said second winding being connected to a bias source, said windings being so arranged that a potential change on the anode of said first tube produces a corresponding change on the cathode of said first tube, said bias source comprising a potential divider connected between said positive and negative terminals of said source of potential and adapted to prevent said first vacuum tube from conducting before a predetermined time interval as determined by the potential on the control grid of said first vacuum tube, a storage capacitor connected between said control grid and said negative terminal and also to said cathode of said second vacuum tube, the anode of said second vacuum tube and the cathode of said third vacuum tube being connected to one another and also coupled through a variable condenser to a source of trigger pulses, the anode of said third vacuum tube being connected to said negative terminal, and output circuit means coupled to the cathode circuit of said first vacuum tube whereby said blocking oscillator provides a series of output pulses an integral number of times lower in frequency than the frequency of said trigger pulses.

2. In a frequency dividing circuit, a blocking oscillator comprising a vacuum tube having at least an anode, control grid, and cathode, a source of potential, a bias source for said cathode, said anode being connected through a plate inductance to the positive terminal of said potential source, said cathode being connected through a cathode inductance to said bias source, said cathode and anode inductances being mutually inductive such that a potential charge on one electrode produces a corresponding relative potential charge on the other electrode, said bias source comprising a potential divider connected between the positive and negative terminals of said potential source, a storage condenser connected between the control grid of said vacuum tube and the negative terminal of said potential source, said storage condenser being receptive of a repeating waveform having a predetermined frequency, said bias source being adapted to prevent said tube from conducting before a predetermined time interval as determined by the charging of said storage condenser, a discharge path means for said storage condenser, and an output circuit coupled to said blocking oscillator in which are produced a series of output pulses which are related in frequency to said repeating waveform.

3. In a frequency dividing circuit, a blocking oscillator including a vacuum tube having at least an anode, control grid, and cathode, inductive coupling means regeneratively connected between said cathode and said anode for providing an increase in voltage on said cathode relative to a point of reference potential for an increase in voltage on said anode relative to said point of reference potential, storage means connected between said control grid and said point of reference potential, unidirectional means for applying an input waveform to said storage means, cut-off bias means connected between the grid and the cathode of said vacuum tube, means for discharging said storage means, and output means coupled to said blocking oscillator, in which is produced a series of output pulses related in periodicity to said input waveform.

4. Apparatus in accordance with claim 2 in which said cathode bias means is variable.

5. In a frequency dividing circuit, a blocking oscillator comprising an electron discharge device having at least a cathode, control grid, and anode, a source of potential having a positive and a negative terminal, a two-winding transformer for coupling in like phase, potential changes at said anode to said cathode, one end of one winding of said transformer being connected to said anode and the other end of said one winding being connected to said positive terminal, one end of the second winding of said transformer being connected to said cathode and the other end of said second winding being galvonically coupled to said negative terminal, storage means receptive of input waveforms and connected between said negative terminal and said control grid, means for applying a cut-off bias between said control grid and said cathode of said device, and an output circuit coupled to said blocking oscillator.

6. The circuit of claim 5, in which said means for applying a bias includes a resistance in parallel with a capacitance, the parallel combination being coupled between the other end of said second winding and said negative terminal.

JOHN K. PHELAN.

References Cited in the file of this patent

UNITED STATES PATENTS

| Number | Name | Date |
|---|---|---|
| 2,113,011 | White | Apr. 5, 1938 |
| 2,193,850 | Andrieu et al. | Mar. 19, 1940 |
| 2,221,452 | Lewis | Nov. 12, 1940 |
| 2,254,087 | Percival | Aug. 26, 1941 |
| 2,398,097 | Kent | Apr. 9, 1946 |
| 2,411,573 | Holst et al. | Nov. 26, 1946 |
| 2,411,648 | Brauer | Nov. 26, 1946 |
| 2,413,440 | Farrington | Dec. 31, 1946 |
| 2,416,158 | Coykendall | Feb. 18, 1947 |